United States Patent [19]
Creamer

[11] Patent Number: 5,968,388
[45] Date of Patent: Oct. 19, 1999

[54] STEAM COOKING APPLIANCE WITH A CORRUGATED HEAT TRANSFER MEMBRANE AND THERMALLY CONDUCTIVE FILLER

[75] Inventor: Kurt S. Creamer, Apex, N.C.

[73] Assignee: Middleby Marshall, Inc., Elgin, Ill.

[21] Appl. No.: 08/966,014

[22] Filed: Nov. 7, 1997

[51] Int. Cl.⁶ .................................................. A21B 1/00
[52] U.S. Cl. ...................... 219/401; 219/385; 392/401; 392/455
[58] Field of Search ..................... 219/401, 385, 219/386; 165/58, 104.19; 392/401, 402, 455, 458; 126/20

[56] References Cited

U.S. PATENT DOCUMENTS

| | | | |
|---|---|---|---|
| 4,189,995 | 2/1980 | Lohr et al. | 99/447 |
| 4,415,025 | 11/1983 | Horvath . | |
| 4,689,720 | 8/1987 | Daszkowski . | |
| 4,993,482 | 2/1991 | Dolbear et al. . | |
| 5,014,117 | 5/1991 | Horvath et al. . | |
| 5,031,689 | 7/1991 | Jones et al. . | |
| 5,159,531 | 10/1992 | Horvath et al. . | |
| 5,270,902 | 12/1993 | Bellar et al. . | |
| 5,557,501 | 9/1996 | DiStefano et al. . | |

FOREIGN PATENT DOCUMENTS 61-268218  11/1986  Japan ...................................... 219/385

*Primary Examiner*—Teresa Walberg
*Assistant Examiner*—Sharontina T. Fuqua
*Attorney, Agent, or Firm*—Coats & Bennett, P.L.L.C.

[57] ABSTRACT

A compressible and thermally conductive heat transfer membrane is placed between heating blocks and the bottom of a reservoir in a steam oven. This heat transfer membrane assists in distributing the heat from the heating block to the reservoir while serving as a compliant interface for maximizing contact uniformity and heat distribution between the heating block and the reservoir. Optionally, spaces within and around the heat transfer membrane may be filled with a thermally conductive grease material to facilitate thermal contact and heat transfer. The inclusion of the heat transfer membrane in steam ovens provides an economical, thermally efficient way to compensate for surface irregularities and mis-matches between heating blocks and reservoir surfaces.

23 Claims, 4 Drawing Sheets

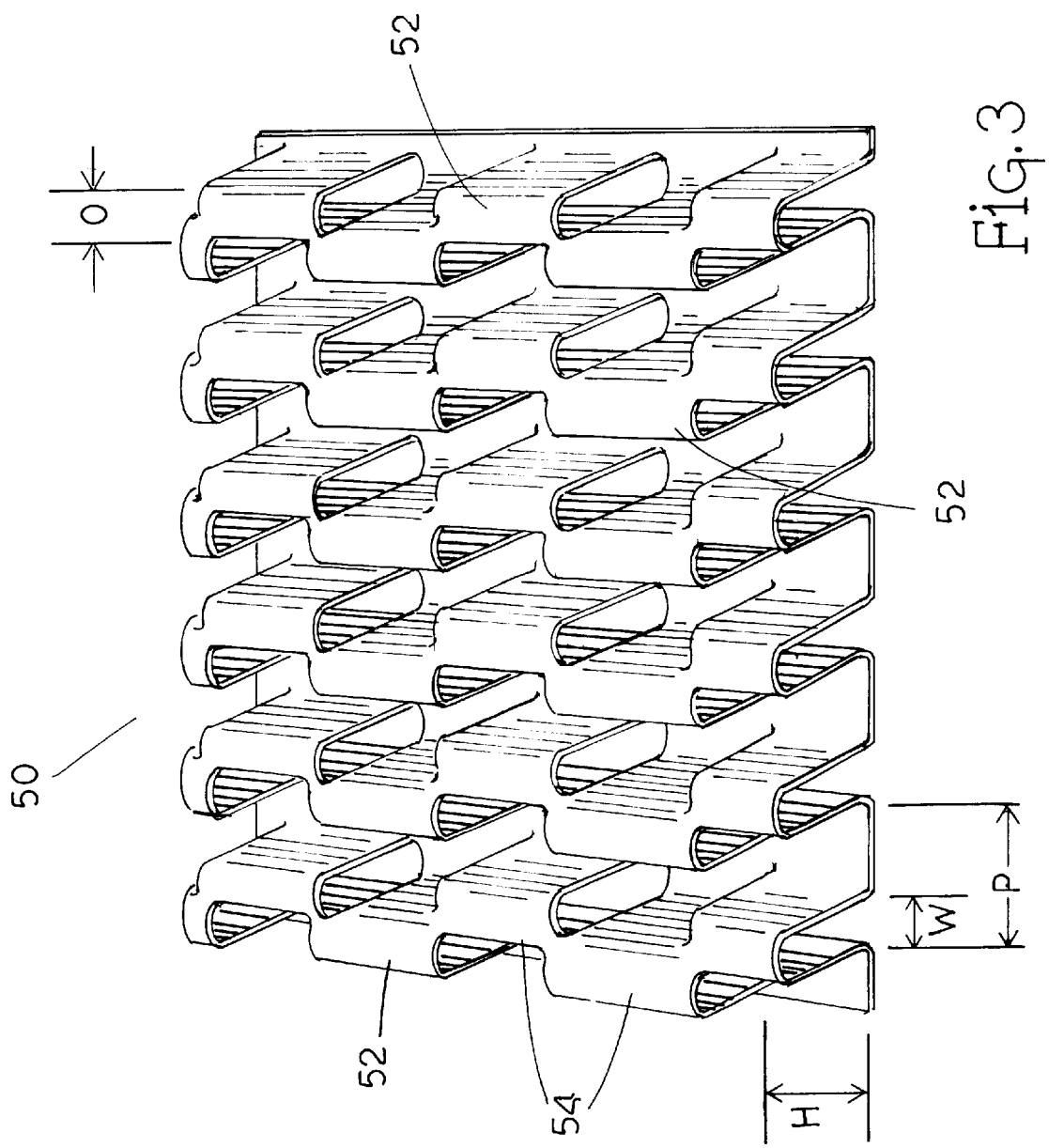

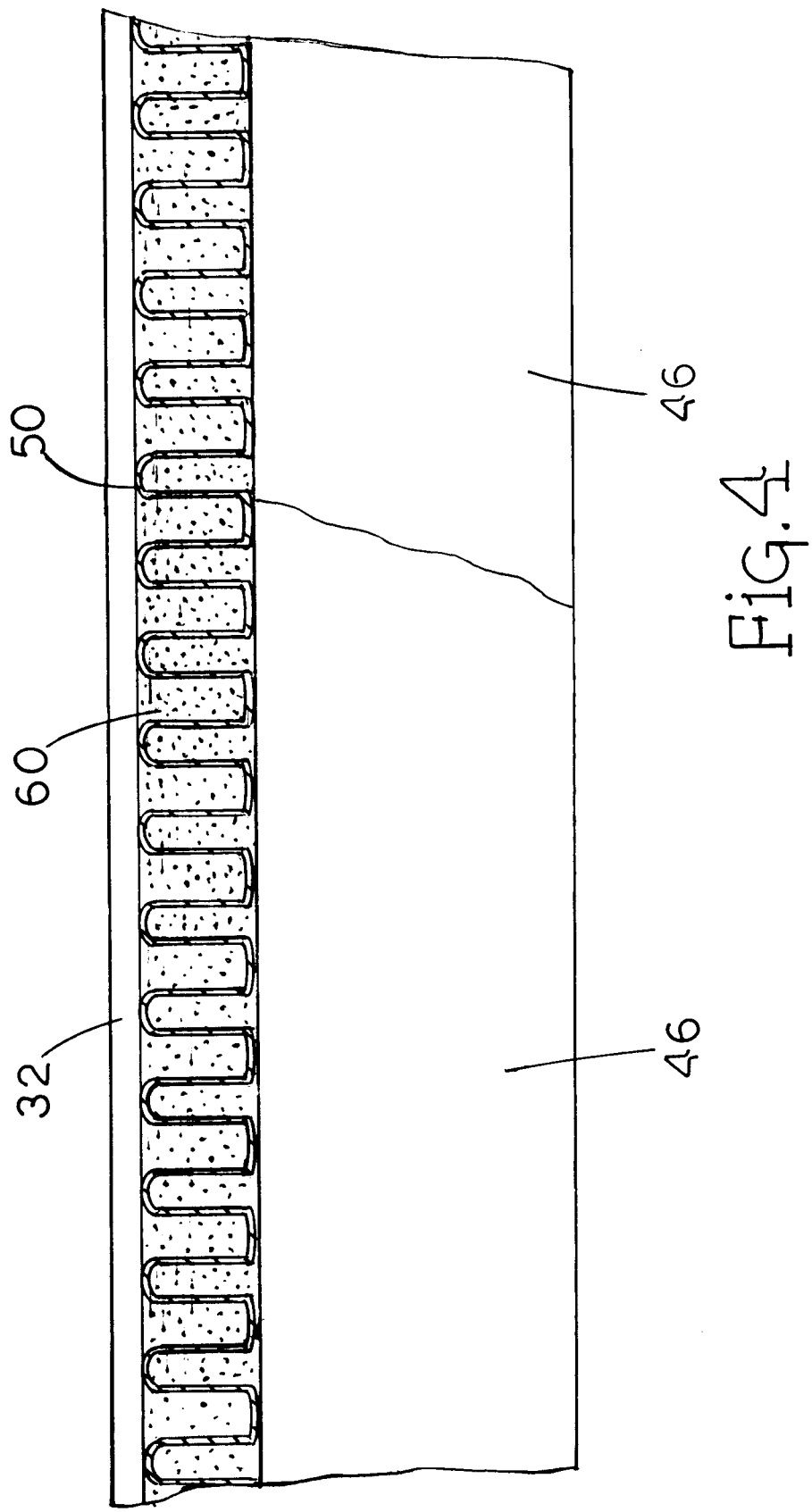

STEAM COOKING APPLIANCE WITH A CORRUGATED HEAT TRANSFER MEMBRANE AND THERMALLY CONDUCTIVE FILLER

FIELD OF THE INVENTION

The present invention relates to steam cooking appliances and, more particularly, to a heat transfer membrane disposed between the bottom surface of a steam generating water reservoir and an attached heating block for conducting heat therebetween and compensating for differences in planarity and nonuniformities in spacing.

BACKGROUND OF THE INVENTION

Steam cooking ovens use steam to cook food contained in a cooking cavity. Typically, electrical resistance heating elements are used to heat water in a water reservoir to generate steam. While there are many configurations of steamers, one approach is to locate the reservoir inside the cooking cavity. That is, water usually is contained in a dedicated reservoir in the bottom of the cooking cavity. In such ovens, one or more heating elements are either immersed in the water or enclosed within heating blocks located immediately below the reservoir.

When heating elements are directly immersed in the steam generating water, one of the common problems is that, since the heating element is in direct contact with the water, any impurities in the water will tend to coat the element (i.e.: calcify) and thereby reduce the heating element's efficiency and capability. In addition, the heating element must be suspended above the bottom surface of the reservoir to avoid heating the reservoir housing. Because of this, it is possible for the water level to fall to a point where the heating element is exposed to the atmosphere within the cooking cavity. When this occurs, there is a high risk of damaging the heating elements despite the protections provided by temperature limiting switches.

In an alternate configuration, a heating element is encased in a rigid thermally conductive heating block and the heating block is in turn attached to the underside of the cooking cavity. The heating block helps diffuse heat more evenly across the bottom surface of the cooking cavity producing more even cooking. Enclosing heating elements in heating blocks also increases the thermal mass surrounding the heating element, leading to more stable and precise control of the heating element itself. Further, physically separating the heating elements from the water reduces calcification problems.

One problem with using heating blocks is that the bottom surface of the reservoir will rarely be fully coplanar with the contact surface of the heating block. Casting or machining irregularities during production and warpage of the reservoir floor during use are factors which contribute to this problem. Uneven contact between the heating block and the reservoir floor leads to hotspots and uneven cooking. In extreme cases, the bottom of the reservoir floor may warp to such an extent that localized areas of the bottom surface protrude above the water level, creating more severe hotspots. One method of addressing this problem is to machine the surfaces to very close tolerances. However, this approach is expensive and does not address changes in shape that may occur during repeated use.

Thus, there remains a need for an economical way to compensate for surface irregularities and mis-matches between heating blocks and reservoir surfaces in steam ovens.

SUMMARY OF THE INVENTION

A compressible and thermally conductive heat transfer membrane is placed between the heating blocks and the bottom of the reservoir. This heat transfer membrane assists in distributing the heat from the heating block to the reservoir while serving as a compliant interface for maximizing contact uniformity and heat distribution between the heating block and the reservoir. That is, the heat transfer membrane provides a thermally conductive path between the heating block and the reservoir while compensating for surface irregularities in the heating block and the reservoir or nonuniformities in the spacing therebetween. Optionally, spaces within the heat transfer membrane, or between the engaging surfaces of the heat transfer membrane and the reservoir or the heating block, may be filled with a thermally conductive filler grease to facilitate thermal contact and heat transfer. The inclusion of the heat transfer membrane in steam ovens provides an economical, thermally efficient way to compensate for surface irregularities and mismatches between heating blocks and reservoir surfaces.

BRIEF DESCRIPTION OF THE DRAWINGS

FIG. 3 is a detail view of one embodiment of the heat transfer membrane showing the staggered corrugated configuration.

FIG. 4 is a partial side view of the heat transfer membrane disposed between the floor and a heating block.

DETAILED DESCRIPTION OF THE INVENTION

The present invention compensates for surface irregularities and mis-matches between heating blocks 46 and reservoir surfaces 40 by introducing therebetween a deformable heat transfer membrane 50 and, optionally, a pliable thermally conductive filler material 60.

Figure 1:
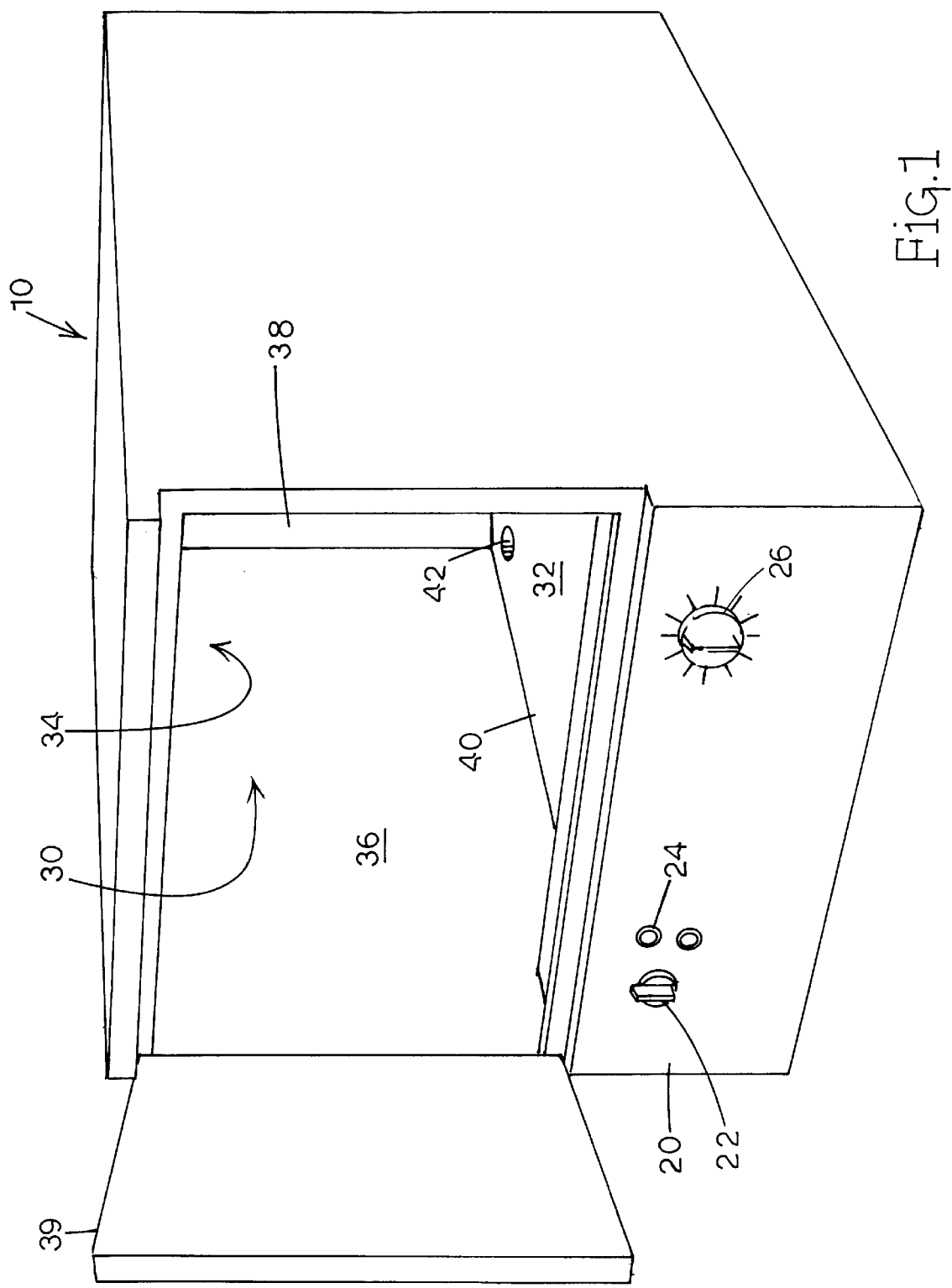
FIG. 1 is a perspective view of the steamer oven of the present invention.
Figure 2:
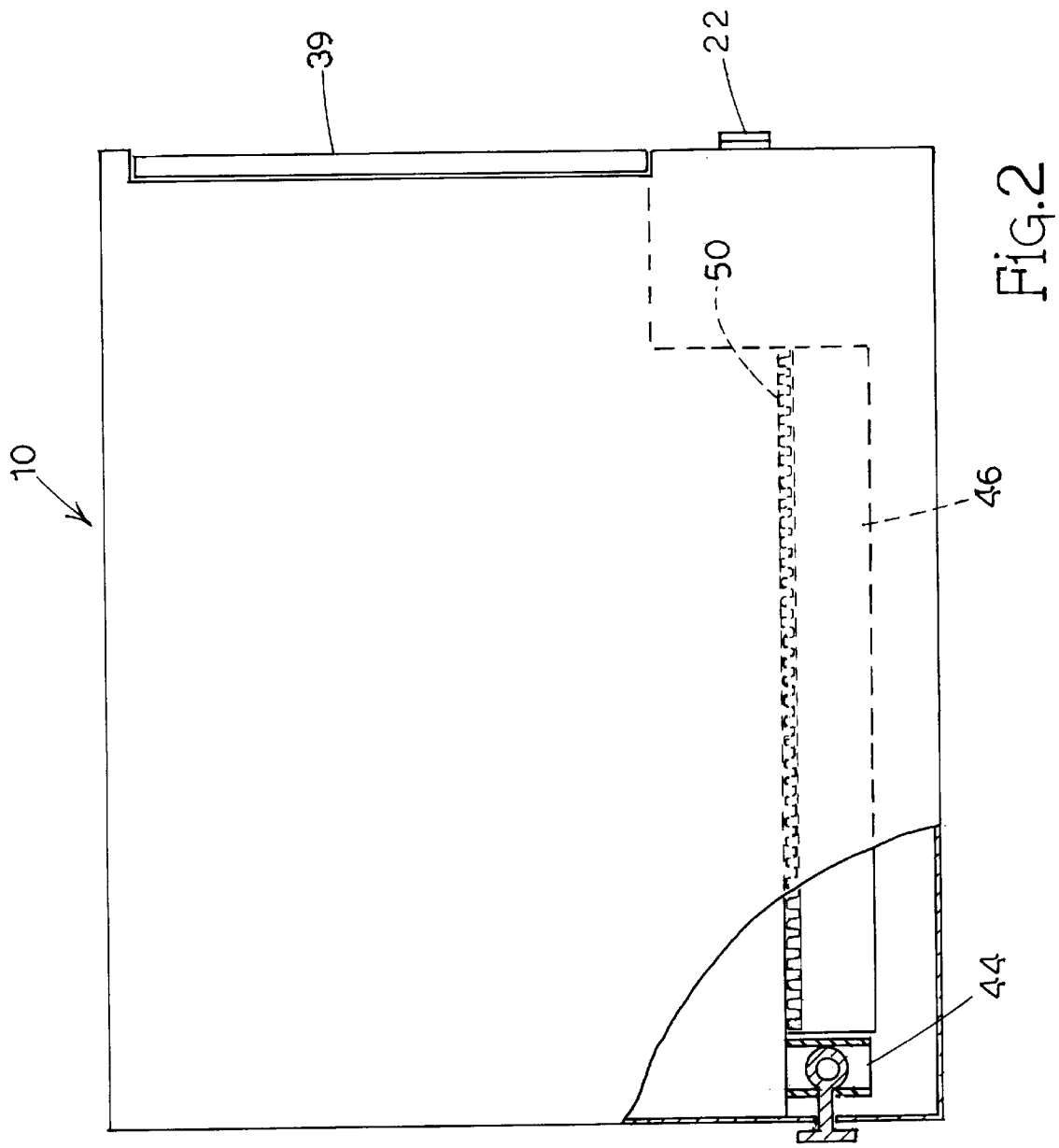
FIG. 2 is a side view of the steamer oven of FIG. 1.

FIG. 1 and FIG. 2 show a steamer 10 of the present invention. The steamer 10 includes controls 20, a cooking cavity 30, a door 39, and heating blocks 46. The controls 20 may be of any type well known in the industry, but typically include an on/off switch 22, indicator lights 24, and a timer 26, which perform functions well known in the art. For instance, the on/off switch 22 is electrically connected to the steamer's electrical controls and the indicator lights 24 indicate when the steamer is on and warn of a low water condition.

The cooking cavity 30 is defined by the door 39, a floor 32, a ceiling 34, sidewalls 36, and a rear wall 38. The floor 32 of the cooking cavity 30 includes a recessed area for holding water known as a reservoir 40. The portion of floor 32 under the reservoir 40 is preferably tilted towards the left rear corner of the cooking cavity 30. In that corner is a drain 42 which is in turn connected to a drain valve 44. The drain 42 allows the water in the reservoir 40 to be drained for cleaning of the floor 32, particularly the reservoir 40.

Heating blocks 46 are provided for heating the water in the reservoir 40 and turning it into steam. As shown in FIG. 2, the heating blocks 46 are disposed beneath the reservoir 40. Heating blocks 46 may come in a variety of shapes and sizes. In the preferred embodiment, each heating block 46 is a rectangular block of aluminum with one or more embedded but removable electrical resistance elements (not shown). A plurality of these heating blocks 46 are proximate to the underside of the floor 32, beneath the reservoir 40. The heating blocks 46 are secured in place by any appropriate means. In a preferred embodiment, the heating blocks are secured to the underside of the reservoir 40 by clamps running between threaded rods welded to the underside of the reservoir 40.

The heating blocks 46 are controlled by the steamer control circuits in any suitable fashion known in the art. For instance, when steam generation is required, power is supplied to the electrical resistance elements. The electrical resistance elements thereby produce heat energy which is conducted to reservoir 40 via the heating blocks 46. For safety reasons, it is common for the heating elements to have temperature limit switches (not shown) which disable the heating elements if unsafe temperatures are reached.

In some embodiments, a heating block 46 may contain both main heating elements and idle heating elements. Idle heating elements generate a small amount of heat while the main heating elements are off in order to counter-balance the cooling heat loss when the cooking cavity 30 contains no food. As known in the industry, using idle heating elements in this fashion causes the main heating elements to be cycled on and off less frequently, thereby increasing main heating element life.

Referring now to FIGS. 2–4, disposed between the heating blocks 46 and the floor is a heat transfer membrane 50. The heat transfer membrane 50 is made from a deformable material that conducts heat. The preferred material is aluminum. It is further preferred that the heat transfer membrane 50 be in a single flexible sheet form, but this is not required.

Referring to FIG. 3, the heat transfer membrane 50 is shown in greater detail. The heat transfer membrane 50 is corrugated with individual corrugations 52 and preferably arranged in alternating adjacent offset rows of corrugations 54. The purpose of the corrugations 52 is to add flexibility and to allow for localized deformations. The individual corrugations 52 may be of any appropriate shape. In one embodiment, the individual corrugations 52 have the following approximate dimensions: height H of $\frac{1}{16}$ inch, width W of $\frac{1}{30}$ inch, period P of $\frac{1}{15}$ inch, and the adjacent offset rows 54 are offset O by approximately $\frac{1}{4}$ of the period P. While the particular dimensions given above are for one embodiment, other values of height H, width W, period P, and offset O may be used. For instance, larger values of H may be used, but a significant drop in performance is expected when H is above $\frac{3}{16}$ inch. Likewise, the period P could be anywhere in the range of $\frac{1}{8}$ inch to $\frac{1}{30}$ inch.

To reduce cost, the heat transfer membrane 50 is typically formed from a single thin sheet of metallic material. Preferably, the material is 6 mil thick aluminum, but other materials and thicknesses are acceptable provided the individual corrugations 52 are similarly deformable.

This configuration of the heat transfer membrane 50 provides multiple paths for conducting heat from one surface of the heat transfer membrane 50 to the other. In addition, the individual corrugations 52 are flexible, which allows for deformation of individual corrugations 52 to compensate for local irregularities where the heat transfer membrane 50 contacts an adjacent surface. It is anticipated that the heat transfer membrane 50 will deform only at a localized number of corrugations 52 while leaving the remainder of the heat transfer membrane 50 in its normal configuration, thereby maintaining optimal contact between the heat transfer membrane 50 and the adjacent surface. The flexibility of the individual corrugations 52 will allow the heat transfer membrane 50 to compensate for local surface irregularities as well as nonuniformities in the spacing between the surfaces.

When compressive force is applied to the heat transfer membrane 50, the individual corrugations 52 will flex and conform to the surface profiles of the adjacent components. If the surface contours change as a result of use, for example if the bottom of the cooking cavity 30 becomes warped after prolonged use, the compressive force on the heat transfer membrane 50 may be increased to provide the necessary conformance to the new surface profile or the heat transfer membrane 50 may simply be replaced.

A thermally conductive filler material 60 may optionally be used between the heating block 46 and the heat transfer membrane 50 and/or between the heat transfer membrane 50 and the floor 32 in order to facilitate more efficient heat transfer. See FIG. 4. This filler material 60 should be thermally conductive and pliable and may comprise, for example, a thermally conductive paste, grease, viscous fluid, or the like. When the pliable filler material 60 is applied between the heat transfer membrane 50 and an adjacent surface, the filler material 60 compensates for irregularities in the adjacent surface not addressed by the heat transfer membrane 50 such as a localized depression. The filler material 60 may also be used to increase the thermal contact between the heat transfer membrane 50 and the adjacent surface where the force urging the components together is not sufficient to provide good contact. The filler material 60 increases the effective contact area between the heat transfer membrane 50 and the adjacent surface. Preferably, the filler material 60 also fills in the corrugations of the heat transfer membrane 50; in such an arrangement, the heat transfer membrane 50 functions as a retention matrix for the filler material 60.

The description above has assumed that the heating is via common electric resistance heating. However, the present invention is also useful when other types of heating are used such as gas heating and induction heating. The invention functions well whenever heating blocks 46 are used, regardless of how the heating blocks 46 are heated.

A steamer oven has been constructed using the present invention. The oven has a cooking cavity 30 of 2.1 cubic feet; a reservoir 40 of approximately 2.2 gallons; three main heating elements of 2675 watts; an idle heating element of 375 watts; three aluminum heating blocks 46 of $\frac{3}{4}$ by $3\frac{1}{2}$ by 16 inch dimensions; three heat transfer membranes 50 of $3\frac{1}{2}$ by 16 inch dimension made from corrugated 6 mil thick aluminum with height H of $\frac{1}{16}$ inch, width W of $\frac{1}{30}$ inch, period P of $\frac{1}{15}$ inch, and offset O of approximately $\frac{1}{60}$ inch made by Robinson Fin Machines, Inc. of Kenton, Ohio; and a filler material 60 of thermally conductive grease known as Thermalloy 255, made by Thermalloy, Inc. of Dallas, Tex.

The present invention may, of course, be carried out in other specific ways than those herein set forth without departing from the spirit and the essential characteristics of the invention. The present embodiments are therefore to be construed in all aspects as illustrative and not restrictive and all changes coming within the meaning and equivalency range of the appended claims are intended to be embraced therein.

What is claimed is:

1. A steam cooker, comprising:
   a) a cooking cavity having a floor;
   b) a reservoir for holding water to heated;
   c) a heating block for generating heat for heating water into steam;

d) a corrugated thermally conductive heat transfer membrane disposed between said reservoir and said heating block; and e) wherein heat from said heating block for generating steam for said cooking cavity is conducted to said reservoir via said heat transfer membrane.

2. The steam cooker of claim 1 wherein said reservoir is internal to said cooking cavity.

3. The steam cooker of claim 1 wherein said floor includes said reservoir.

4. The steam cooker of claim 1 wherein said heat transfer membrane is compressed between said heating block and said reservoir.

5. The steam cooker of claim 1 wherein said heat transfer membrane is aluminum.

6. The steam cooker of claim 1 further comprising a thermally conductive filler material disposed within said corrugations.

7. The steam cooker of claim 1 further comprising a thermally conductive filler material disposed between said heat transfer membrane and said reservoir.

8. The steam cooker of claim 1 further comprising a thermally conductive filler material disposed between said heat transfer membrane and said heating block.

9. The steam cooker of claim 1 wherein said heating block is disposed below said floor.

10. The steam cooker of claim 1 wherein said heating block is disposed beneath said floor.

11. The steam cooker of claim 1 wherein said heating block includes an electric resistance heating element.

12. The steam cooker of claim 1 further comprising a plurality of heating blocks.

13. The steam cooker of claim 12 wherein each of said heating blocks includes a resistance heating element.

14. A steam cooker, comprising:

a) a cooking cavity having a floor; said floor including a reservoir for holding water to heated;

b) a heating block disposed below said floor for generating heat for heating water into steam; said heating block including an electric resistance heating element;

c) a corrugated thermally conductive heat transfer membrane compressed between said reservoir and said heating block; and d) wherein heat from said heating block for generating steam for said cooking cavity is conducted to said reservoir via said heat transfer membrane.

15. The steam cooker of claim 14 further comprising a thermally conductive filler material disposed between said heat transfer membrane and said reservoir.

16. The steam cooker of claim 14 further comprising a thermally conductive filler material disposed between said heat transfer membrane and said heating block.

17. The steam cooker of claim 14 wherein said heat transfer membrane is aluminum.

18. The steam cooker of claim 14 further comprising a thermally conductive filler material disposed within said corrugations.

19. The steam cooker of claim 14 further comprising a plurality of heating blocks.

20. The steam cooker of claim 19 wherein each of said heating blocks includes a resistance heating element.

21. A steam cooker, comprising:

a) a cooking cavity having a floor; said floor including a reservoir for holding water to heated;

b) a plurality of heating blocks disposed below said floor for generating heat for heating water into steam; each of said heating blocks including a resistance heating element;

c) a thermally conductive heat transfer membrane including corrugations compressed between said reservoir and said heating blocks;

d) a thermally conductive filler material disposed:
  i) between said heat transfer membrane and said reservoir;
  ii) within said corrugations; and
  iii) between said heat transfer membrane and said heating blocks; and e) wherein heat from said heating blocks for generating steam for said cooking cavity is conducted to said reservoir via said heat transfer membrane.

22. The steam cooker of claim 21 wherein said heat transfer membrane is aluminum.

23. The steam cooker of claim 21 wherein said corrugations are arranged in alternating adjacent offset rows.

* * * * *